(12) United States Patent
Pinte et al.

(10) Patent No.: US 8,682,555 B2
(45) Date of Patent: Mar. 25, 2014

(54) METHOD FOR CONTROLLING A TORQUE TRANSMITTING DEVICE WITH LEARNING FUNCTION

(75) Inventors: Gregory Pinte, Oud-Heverlee (BE); Wim Symens, Kessel-Lo (BE); Walter Verdonck, Hove (BE); Mark Versteyhe, Oostkamp (BE); Maarten Van Speybroeck, Zwijndrecht (BE); Jan Swevers, Meldert (BE); Paul Sas, Bierbeek (BE)

(73) Assignee: Flanders' Mechatronics Technology Centre VZW, Brussels (BE)

( * ) Notice: Subject to any disclaimer, the term of this patent is extended or adjusted under 35 U.S.C. 154(b) by 51 days.

(21) Appl. No.: 13/257,105

(22) PCT Filed: Mar. 17, 2009

(86) PCT No.: PCT/EP2009/053164
§ 371 (c)(1),
(2), (4) Date: Sep. 16, 2011

(87) PCT Pub. No.: WO2010/105671
PCT Pub. Date: Sep. 23, 2010

(65) Prior Publication Data
US 2012/0016561 A1  Jan. 19, 2012

(51) Int. Cl.
*F16D 48/06* (2006.01)
(52) U.S. Cl.
USPC .......................................................... 701/68
(58) Field of Classification Search
USPC .............................................. 701/51, 53, 68
See application file for complete search history.

(56) References Cited

U.S. PATENT DOCUMENTS 4,796,490 A * 1/1989 Butts et al. ..................... 477/148

5,853,076 A 12/1998 McKee et al.
(Continued)

FOREIGN PATENT DOCUMENTS

| DE | 102006014141 | 10/2007 |
|---|---|---|
| EP | 0492199 | 7/1992 |
| WO | 0225131 | 3/2002 |
| WO | 2006029783 | 3/2006 |
| WO | 2008118245 | 10/2008 |

OTHER PUBLICATIONS

Gregory Pinte et al., Iterative Learning Control for wet-plate clutches, 27th Benelux Meeting on Systems and Control, Heeze, The Netherlands, Mar. 19, 2008, XP002554594.

(Continued)

*Primary Examiner* — Thomas Tarcza
*Assistant Examiner* — Alex C Dunn
(74) *Attorney, Agent, or Firm* — Bacon & Thomas, PLLC

(57) ABSTRACT

Apparatus (control device) and a method for controlling a torque transmitting device such as a brake, wet clutch, dry clutch (10) during a filling and slip phase is provided, e.g. for coupling a first shaft (12) to a second shaft (14) via the wet clutch (10). A reference profile (52) for a control variable is provided, wherein the chronological progress of said control variable influences the position of a piston (22) for actuating clutch elements (16, 18). Each clutch element (16, 18) is connected to the first shaft (12) or the second shaft (14), with respect to a cylinder (20) of the wet clutch (10), and the control variable is determined during each coupling and a valve (38) for applying a pressure source to the piston (22) is operated, wherein the valve (38) is controlled during each coupling by means of a feed forward closed loop control (54) such that the control variable follows the reference profile (52). Due to the increased control quality by considering non-linear effects by means of the reference profile (52) for the feed forward closed loop control (54) at every coupling through learning, the coupling time can be shortened without increasing the risk of an uncomfortable coupling behavior.

17 Claims, 5 Drawing Sheets

(56) References Cited

U.S. PATENT DOCUMENTS

| | | | |
|---|---|---|---|
| 6,122,583 A * | 9/2000 | Kirchhoffer et al. | 701/51 |
| 6,216,074 B1 | 4/2001 | Hillman et al. | |
| 6,253,140 B1 * | 6/2001 | Jain et al. | 701/67 |
| 6,385,520 B1 | 5/2002 | Jain et al. | |
| 6,415,213 B1 * | 7/2002 | Hubbard et al. | 701/51 |
| 6,769,398 B2 * | 8/2004 | Surnilla et al. | 123/339.19 |
| 6,961,646 B2 * | 11/2005 | Soliman et al. | 701/51 |
| 7,107,135 B2 * | 9/2006 | Soliman et al. | 701/55 |
| 8,187,145 B2 * | 5/2012 | Kaminsky et al. | 477/5 |
| 2008/0076631 A1 | 3/2008 | Henning | |
| 2009/0101464 A1 | 4/2009 | Doebele et al. | |
| 2009/0177291 A1 * | 7/2009 | Boe et al. | 700/29 |

OTHER PUBLICATIONS

27th Benelux Meeting on Systems and Control Final Program, Mar. 19, 2008, XP002554595.

Flanders Mechantronic Technology Center, Annual Report 2008, Jul. 8, 2007, XP002554596.

International Search Report in PCT/EP2009/053164, Dec. 3, 2009.

Written Opinion in PCT/EP2009/053164, Dec. 3, 2009.

IPRP for PCT/EP2009/053164, Sep. 20, 2011.

* cited by examiner

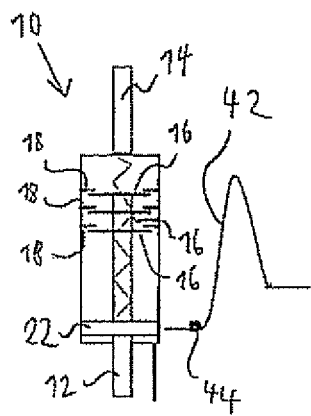
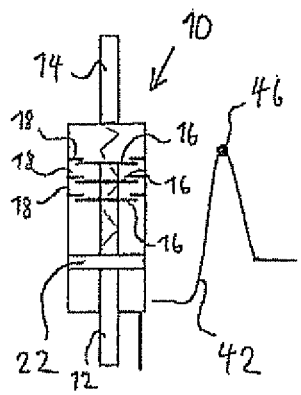
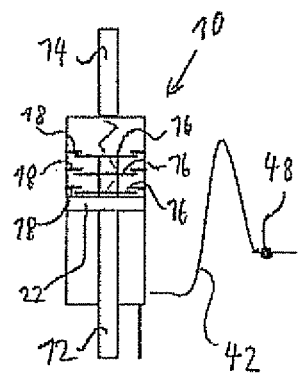
Fig. 4　　　　Fig. 5　　　　Fig. 6
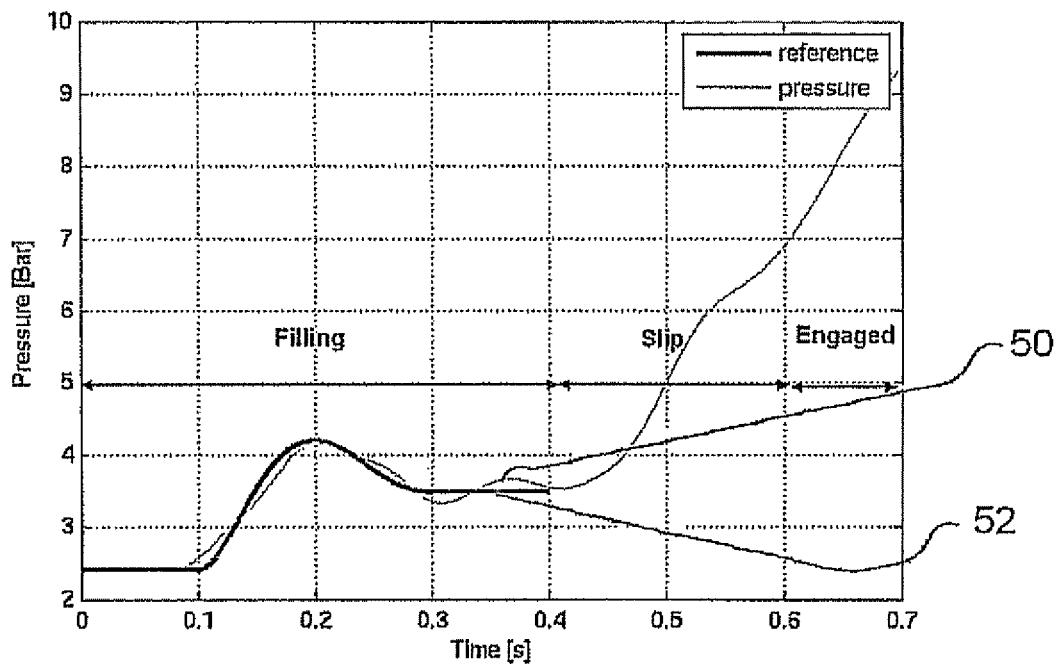
Fig. 7

METHOD FOR CONTROLLING A TORQUE TRANSMITTING DEVICE WITH LEARNING FUNCTION

TECHNICAL FIELD OF THE INVENTION

The present invention relates to apparatus (control device) and a method for controlling a brake, wet clutch, a dry clutch or more generally disengageable torque transmitting devices, by means of which a coupling of first torque transmitting elements to second torque transmitting elements, in particular of a first shaft to a second shaft, can be performed. The present invention further relates to a corresponding brake, wet clutch, a dry clutch or more generally a disengageable torque transmitting device, which can be controlled by means of such kind of a method, to software and to vehicles including the brake or clutch.

BACKGROUND OF THE INVENTION

Clutches are disengageable torque transmitting devices. Wet clutches transmit torque from a first shaft to a second shaft by means of friction. Wet clutches are often used in power transmissions particularly of off-road vehicles, earth moving vehicles, bulldozers, tractors and agricultural machines as well as in stationary production machines and the like to selectively engage a device. In the engaged state a piston, which is movably received by a clutch chamber such as a cylinder, presses a first set of clutch elements, which are connected to the first shaft, towards a second set of clutch elements, which are connected to the second shaft, for transferring torque. In order to provide the necessary pressure, first a filling space between the piston and the clutch chamber is filled with suitable oil or other liquid, so that the piston is displaced by the oil from a disengaged state towards the clutch elements (filling phase). When the pressure inside the filling space is increased further, the piston is pressed against the clutch elements in a slip phase. The pressure increases until a third phase is reached in which the revolution speed of the first shaft (input shaft) corresponds to the speed of the second shaft (output shaft). When the pressure applied by the piston and the position of the piston is mainly constant and the revolution speed of the first shaft corresponds mainly to the second shaft, the filling and slip phases are over and the engaged state is reached. In the disengaged state the piston should be positioned as far as possible from the clutch elements, thus avoiding losses due to viscous friction of the hydraulic oil between the clutch elements or a slow rotation of the second shaft.

Brakes on wheels or moving parts of machines apply a negative torque, e.g. by pressure between brake shoes or linings and a part of the wheel or a moving part of a machine. Brakes are usually applied by pressurising a brake cylinder chamber and a piston applies force to the brake shoes or linings. Rapid braking can cause wheel lock up and skidding in an automotive vehicle or excessive stresses in a machine. Too slow an application of the brakes can result in dangerous situations developing.

In a clutch torque is transferred between a first shaft and a second second shaft, i.e. between a first torque transmitting element and a second torque transmitting element. In a brake torque is transferred between a first torque transmitting element, e.g. brake shoe or lining and a second torque transmitting element, e.g. a friction plate attached to a wheel.

In order to provide a fast coupling of the first torque transmitting element and a second torque transmitting element, e.g. between the first shaft to the second shaft, it is necessary to apply a high filling pressure to the piston during the filling phase leading to a fast displacement of the piston. But when the pressure is chosen too high, the piston makes suddenly brutal contact with the torque transmitting elements such as the clutch elements or brake elements resulting in undesired high peaks in the transmitted torque, e.g. possibly stalling of the engine, skidding of the vehicle or damage of a machine. In particular, there is not only a need to apply a clutch safely and quickly but there is also a need for emergency braking which is rapid but safe.

From US 2008/0076631 A1 it is known to determine a suitable filling pressure for the filling phase during a first calibration of the wet clutch by means of a trial and error method according to a Newton fix point iteration. The applying of the filling pressure is stopped automatically, when a predetermined threshold pressure between the piston and the clutch elements has been reached. The empirically determined filling pressure is stored in a control device for a valve connecting the filling space with a liquid pressure source, so that at every subsequent coupling during normal operation by an operator this filling pressure is used.

From U.S. Pat. No. 6,216,074 B1 it is further known to determine the coupling time between initiating the filling phase and reaching the engaged state. If the determined time is too long, the filling time, during which the filling pressure is applied to the piston, is lengthened.

It is a disadvantage of such kinds of methods for controlling a wet clutch that they cannot take into account changing environmental conditions like varying temperatures and system variations like wear of the friction plates in wet clutches. Therefore these methods are conservative in engagement time. There is a permanent need to shorten the coupling time without increasing the risk of an uncomfortable coupling behavior, like a brutal contact between the piston and the clutch elements, and therefore it is desirable to take into account the changing environmental conditions and system variations.

A further problem associated with prior systems is that the control of torque transferring devices such as brakes or clutches in large equipment is a safety critical application. This has lead to a very conservative approach with respect to the number of parameters that can be changed to provide an optimum adaption of the control signal for the filling phase to the prevailing conditions, e.g. wear of clutch plates or brake shoes. It would be desirable to have more degrees of freedom for adaption of the control signal while maintaining a secure application.

SUMMARY OF THE INVENTION

It is an object of the present invention to provide an alternative apparatus (e.g. control device) and a method for controlling a brake, wet clutch, a dry clutch or more generally a torque transmitting device, by means of which a coupling of a first torque transmitting element to a second torque transmitting element, of a first shaft to a second shaft can be performed, to provide a corresponding alternative brake, wet clutch, a dry clutch or more generally a torque transmitting device, which can be controlled by means of such kind of a method and also to provide vehicles including the brake, clutch or torque transmitting device, as well as software.

Accordingly, the present invention provides apparatus and a method for controlling a brake, wet clutch, a dry clutch or more generally a torque transmitting device, as well as a brake, wet clutch, a dry clutch or more generally a torque transmitting device itself, with the advantage that the coupling time can be shortened without increasing the risk of an uncomfortable coupling behavior.

The above objective is accomplished by apparatus and a method for controlling a brake, wet clutch, a dry clutch or more generally a torque transmitting device, as well as by a brake, wet clutch, a dry clutch or more generally a torque transmitting device according to the present invention as indicated in the accompanying claims, as well as by a vehicle including the brake, clutch or torque transmitting device, by software and by a control device for implementing the control algorithm. Such a brake, clutch or torque transmitting device may be included in a suitable vehicle such as in an off-road vehicle, earth moving vehicle, bulldozer, tractor or agriculture machine as well as in stationary production machines and the like.

According to an aspect of the invention a method is provided for controlling a brake, a wet clutch, a dry clutch or more generally a torque transmitting device during a filling phase of a fluid actuator for coupling a first torque transmitting element to a second torque transmitting element, e.g. a first shaft to a second shaft via the brake, wet clutch, dry clutch or more generally the torque transmitting device, the method comprising the steps of:

provided a reference profile for a control variable, wherein the chronological progress of said control variable influences the position of the fluid actuator such as a piston for actuating brake or clutch elements or more generally torque transmitting elements, with respect to a pressure chamber, e.g. cylinder of the brake, wet clutch, dry clutch or more generally the torque transmitting device;

determining the control variable during each coupling; and operating a valve for applying fluid from a pressure source to the fluid actuator such as the piston, wherein the valve is controlled during each coupling by means of a feed forward controller such that the control variable follows the reference profile.

In embodiments of the present invention, each torque transmitting element is connected to a first shaft or a second shaft.

The applied controller can also be a feedforward closed loop controller, which is a combination of a feedback and a feedforward controller. The feedback controller can be zero as well as a filter. By means of the control variable it is possible to determine directly or indirectly the position of the fluid actuator, e.g. piston inside the pressure chamber such as a clutch cylinder with sufficient accuracy. In particular, the control variable may be only indirectly associated with the position of the fluid actuator, e.g. piston, for example it can be a pressure at a specific place inside the pressure chamber, e.g. cylinder, wherein the determined pressure is influenced by the speed and/or position of the fluid actuator, e.g. piston or vice versa. In different embodiments of the present invention, the relation of the control variable to the position of the fluid actuator, e.g. piston or to the pressure in the device may be found empirically by testing a brake, wet clutch or a dry clutch or more generally a torque transmitting device of a specific design, so that a relation curve may be generated showing the course of the control variable over the time at a specific displacement or pressure control strategy for the fluid actuator, e.g. piston. For generating an optimized reference profile for the control variable, an optimized movement of the fluid actuator, e.g. piston during the filling phase is given or found and the course of the control variable over the time is stored for use as a reference profile, e.g. a suitable displacement and/or the pressure profile over time is determined. The reference profile is in particular a function of time. This means that the intended value for the control variable varies during the filling phase over time. An optimized movement of the fluid actuator, e.g. piston depends on the intended use and can vary with different applications. Usually a fast displacement of the fluid actuator, e.g. piston up to or near to the torque transmitting elements such as brake or clutch elements is intended in a first phase. The contact between the fluid actuator, e.g. piston and the torque transmitting elements such as the brake or clutch elements is preferably performed at a specific contact pressure, which can be significantly lower than the filling pressure that is used for fast displacement of the fluid actuator, e.g. piston. Using this heuristic movement rule the fluid actuator, e.g. piston can be moved in a two-phase way, e.g. the fluid actuator, e.g. piston is accelerated from the beginning of the filling phase as fast as possible without risking backlashes or vibrations until a specific point of time, when the fluid actuator, e.g. piston is decelerated such that the velocity of the fluid actuator, e.g. piston is restricted when the contact between the fluid actuator, e.g. piston and the torque transmitting elements occurs. Particularly the filling pressure during the filling phase may be significantly higher than the contact pressure. When the contact pressure is reached, the fluid actuator, e.g. piston is preferably at a position such that the first and second torque transmitting elements, e.g. brake or clutch elements are nearly in contact or just touching each other, so that a fast and comfortable coupling between the first and second torque transmitting elements, e.g. between the first shaft and the second shaft can be performed. By incorporating a learning control action in the feedforward controller it is possible to compensate for changing environmental conditions like varying temperatures and to control a non-linear movement of the fluid actuator, e.g. piston, which enables a reduction in the coupling time, preferably to a minimum. Further non-linear influences like inner friction or centrifugal forces can also be compensated for by the use of a learning control action in the feedforward controller. For example, the engagement of a clutch typically has 3 phases: in the first phase (the filling phase), the piston is moving towards the friction plates, but the speed of the output shaft is still zero. In the second phase (the slip phase), the piston comes in contact with the friction plates, and the output shaft starts rotating (with a lower speed than the input shaft). Finally in the engaged phase the rotational speeds of the input and shaft are the same. The engagement of a brake, especially an emergency brake, typically has 3 phases: in the first phase (the filling phase), the piston is moving the brake shoes or linings, but the speed of the wheel or machine part has not changed. In the second phase (the slip phase), the brake shoes or linings come in contact with the wheel or machine part, and the wheel or machine part starts to slow down. Finally in the engaged phase the rotational speeds of the brake linings or shoes and wheel or machine part are the same, i.e. stationary.

The learning system in accordance with embodiments of the present invention is preferably only used in the filling phase and not in the slip phase. For a complete engagement, this learning controller for the filling phase should preferably always be combined with another controller (feedforward controller, slip feedback controller, . . . ) which controls the slipping phase.

For performing an optimized movement of the fluid actuator, e.g. piston it is sufficient to control a valve, by which a fluid pressure source, like air or oil pressurized by an air or oil pump, can be applied to the fluid actuator, e.g. piston. For example, depending on the amount by which the valve is opened, more or less fluid per time unit is filled into a filling space between the piston and the cylinder for displacing the piston. Using the feed forward closed loop control, the valve is operated such that the control variable follows as closely as possible the reference profile, so that the fluid actuator, e.g.

piston is moved in a preferred or an optimized manner. Further, the control of the valve or valves takes place at every coupling and not only for an initial calibration. Since the feed forward control of the valve by means of the reference profile for the control variable is performed at every initiated coupling, time-variant effects can be compensated for by the introduction of a learning action in the feedforward controller. For example, it is possible to compensate for or allow for a change of the hydraulic oil temperature, for example, during the operation of a machine between cold start conditions and steady state. In particular, it is possible to compensate for or allow for a changing system dynamics due to an increased amount of wear of the brake or clutch elements. Due to the increased control quality by compensating for non-linear effects by means of the learning controller at every coupling, the coupling time can be shortened without increasing the risk of an uncomfortable coupling behavior.

Due to an increased wear of the brake or clutch elements, the fluid actuator, e.g. piston must traverse a greater distance and the time for displacing the fluid actuator, e.g. piston during the filling phase may increase leading to an increased coupling time. To obtain short and smooth brake or clutch engagements, the control variable should track a modified reference profile in this situation. Since the wear of the brake or clutch elements is irreversible, it is preferred to allow for the effect of worn brake or clutch elements by a modification in the reference profile based on the target profile for input and/or output shaft speeds, or alternatively for input and/or output torques, for some of or for every further coupling. The impact of wear of the brake or clutch elements over the time can be allowed for, for example, by lengthening the time at maximum filling pressure and/or by increasing the intended maximum filling pressure. This leads, preferably, to a minimal coupling time even in the case that the necessary displacement of the fluid actuator, e.g. piston increases over time due to wear of the brake or clutch elements.

Preferably the revolution speed of the first shaft and/or the revolution speed of the second shaft is determined and the reference profile is adjusted with respect to a target profile for the revolution speed of the first shaft and/or for the revolution speed of the second shaft. By monitoring the revolution speeds of the first shaft and/or the second shaft it is possible to make the control of the displacement of the fluid actuator, e.g. piston to be at least a support tool for providing an optimized torque transfer between the first and second torque transmitting elements, e.g. between the first shaft and the second shaft. In the case that the reference profile for the control variable is met but not the target profile for the revolution speed(s) for the first shaft and/or the second shaft, the reference profile is adjusted for increasing the accuracy for meeting the target profile. It is possible to overrule the reference profile by means of the target profile and to adjust the control strategy over time and/or to different situations, particularly different brake, dry or wet clutch designs. The reference profile for the feed forward closed loop control can be adaptive by using the target profile for the revolution speed(s) for the first and/or second torque transmitting elements, e.g. the first shaft and/or the second shaft. In particular, the reference profile may be a computed curve or a plurality of computed curves governed by parameters, so that it is possible to adjust one or more parameters of the computed curve(s) for adjusting the reference profile. The target profile for the revolution speed of the first shaft and/or for the revolution speed of the second shaft depends on the user requirements: a trade-off has to be made between smooth and fast brake or clutch engagements. An optimized target profile can be obtained by giving an optimized movement of the fluid actuator, e.g. piston during the filling phase and storing the course of the revolution speed(s) over the time for using as the target profile for further use.

A most preferred adjustment of the reference profile is performed after a predetermined number of couplings, wherein the predetermined number of couplings is particularly $2 \leq N \leq 50$, preferably $3 \leq N \leq 25$, more preferred $4 \leq N \leq 15$ and most preferred $5 \leq N \leq 10$. Since the adjustment of the reference profile is not usually performed at every coupling the calculation effort can be reduced by increasing the times between re-calibration attempts. By adjusting the reference profile, a performance degradation of the control can be prevented or reduced. In particular, in accordance with an embodiment of the present invention, calculation of an adjusted reference profile is done offline, this means without interference to an actually performed control during a coupling. The new reference profile may be calculated in parallel to the controlling of the filling phase, so that the already calculated reference profile may be updated at a suitable point of time, particularly between two couplings. Optionally, two different processors or computing systems are used for performing the control during the filling phase on the one hand and for adjusting the reference profile on the other hand.

In a preferred embodiment the feed forward closed loop control comprises a learning loop such as an ILC loop for compensating an increasing error between the control variable and the reference profile, wherein the ILC loop uses the output signal of the ILC loop of the last coupling as well as the difference between the control variable and the reference profile of the last coupling as inputs to prepare for the next coupling. Iterative Learning Control (ILC) is a technique to increase the tracking accuracy of a system repeating a given operation. A survey of iterative learning control can be found in: Bristow, D. A.; Tharayil, M.; Alleyne, A. G.; Dept. of Mech. Eng., Illinois Univ., Urbana, Ill., USA; Control Systems Magazine, IEEE, Publication Date: June 2006, Volume: 26, Issue: 3, on page(s): 96-114.

Iterative learning control (ILC) is based on the notion that the performance of a control system that executes the same task multiple times can be improved by learning from previous executions (trials, iterations, passes). The objective of ILC is to improve control performance by incorporating error information into the controller for subsequent iterations. In doing so, high performance can be achieved with low transient tracking error despite large model uncertainty and repeating disturbances. Although there is an interest to increase the freedom of control signal selection for controlling torque transmitting devices such as clutches or brakes, traditional control design paradigms do not allow for guaranteeing robustness and stability under such conditions. Iterative learning control allows solving this problem by providing robustness and stability criteria.

ILC differs from other learning-type control strategies, such as adaptive control and neural networks. Adaptive control strategies modify the controller, which is a system, whereas ILC modifies the control input, which is a signal. Additionally, adaptive controllers typically do not take advantage of the information contained in repetitive command signals. Similarly, neural network learning involves the modification of controller parameters rather than a control signal; in this case, large networks of nonlinear neurons are modified. These large networks require extensive training data, and fast convergence may be difficult to guarantee, whereas ILC usually converges adequately in just a few iterations.

In a conventional ILC control scheme, at the end of each iteration, the error is filtered in a first filter, added to the previous control signal, and filtered again in a second filter.

This updated open-loop control is applied in the next iteration. Conditions for the design of the first and second filters are known that obtain monotonic convergence of the error over different trials to the final error. Four of the most popular ILC design techniques are the PD-type and tunable designs, the plant inversion designs, the frequency domain designs and the optimization-based designs all of which can be used with the present invention. The PD-type learning function is a tunable design that can be applied to a system without extensive modeling and analysis. The plant inversion learning function converges quickly but relies heavily on modeling and can be sensitive to model errors. The frequency domain design technique can be used to design a robustly monotonically convergent ILC but at the expense of performance. The quadratically optimal (QILC) designs use a quadratic performance criterion to obtain an optimal ILC. Since ILC is an open-loop control, it has, itself, no feedback mechanism to respond to unanticipated, non-repeating disturbances. As such, a feedback controller in combination with ILC is a preferred embodiment of the present invention. A great advantage that ILC has over traditional feedback and feedforward control is the possibility for ILC to anticipate and preemptively respond to repeated disturbances. This ability depends on the causality of the learning algorithm. Unlike the usual notion of noncausality, a noncausal learning algorithm is implementable in practice because the entire time sequence of data is available from all previous iterations. Hence it is suitable for safety critical applications.

In accordance with embodiments of the present invention, knowledge about the repeated operation can be used by a closed ILC loop for increasing the quality, particularly the accuracy, of the feed forward closed control loop. It is possible to adjust a control signal of the feed forward closed control loop by using results, e.g. experience, from one trial in an appropriate way such that the performance of the overall system in the next trial, like the next coupling, is improved. A high control performance can be achieved with a low transient tracking error despite having a large model uncertainty such as with the wet clutch. Due to the repetitive character of the different engagements of couplings of the brake, dry or wet clutch, the control variable during the filling phase can be tracked accurately by an ILC loop, particularly with changing environmental conditions like varying temperatures. In particular, in the case that an error between the control variable and the reference profile has increased for instance as caused by an increasing hydraulic oil temperature, the ILC loop is able to learn this discrepancy and to store the information about the error of the last coupling for using this information for an improved accuracy at the next coupling.

The control system of embodiments of the present invention have the ability to freely select the control signal at each sampling time instance. Although there is an interest to increase the freedom of control signal selection, traditional control design paradigms do not allow for guaranteeing robustness and stability under such conditions. In particular, the iterative learning control provided by the present invention solves this problem by providing robustness and stability criteria and a great freedom to freely select the control signal at each sampling time instance. It is a particular aspect of the present invention that the control signal for the fluid actuator has a value at each sampling time instance, the value at each time instance being freely selectable and not dictated by a rigid parametric design e.g such as the parametrized filling curves with block shaped control signals which are traditionally used for the control of torque transmitting devices. In particular it is an aspect of the present invention that an iterative learning controller and control method is implemented that has inputs of an error signal and the control signal at each sampling time instance of one or more previous engagements, the output values of the control signal being freely selectable at each sampling time instance.

In one embodiment the displacement of the fluid actuator, e.g. piston with respect to an axially arranged base plate of the pressure chamber, e.g. cylinder is chosen as the control variable. For example, the filling space is located between the base plate of the cylinder and the piston. The displacement of the fluid actuator, e.g. piston can be detected by a distance sensor. For example the fluid actuator, e.g. piston may be connected to a sliding contact, which slides along a conductor of the pressure chamber, e.g. cylinder, so that it is possible to sense the position of the fluid actuator, e.g. piston with respect to the base plate electrically. Other methods can be used both contact and non-contact and wired or wireless.

Preferably more than one control variable is chosen for improving the accuracy of the control. Further, a plurality of control variables leads to a redundant system, so that a defect sensor can be compensated.

In a preferred embodiment of the present invention, the pressure of a filling space of the pressure chamber, e.g. cylinder is chosen as the control variable, wherein the filling space is in communication with the pressure source for providing fluid for displacing the fluid actuator, e.g. piston. The pressure of the filling space can be easily detected without interfering with the fluid actuator, e.g. piston. For instance a pressure sensor may be arranged in a pocket of the pressure chamber, e.g. cylinder. The pressure in the filling space, wherein this pressure is applied to the fluid actuator, e.g. piston, corresponds with a high accuracy to the acceleration of the fluid actuator, e.g. piston during the filling phase and to the contact pressure in the engaged state. It is possible as an option to integrate the pressure in the filling space over time to calculate the displacement of the fluid actuator, e.g. piston at a specific point of time. Hence, the control variable can be derived from one set of measurements rather than by direct measurement. Further a malfunction and/or irregularities of a fluid pump such as an oil pump can be detected and compensated by controlling the valve connecting the pressure source to the filling space.

The invention further relates to brake, dry clutch or a wet clutch or more generally a torque transmitting device for coupling a first torque transmitting element to second torque transmitting element, e.g. a first shaft to a second shaft, comprising a fluid actuator, e.g. piston for actuating brake or clutch elements or more generally torque transmitting elements, a pressure chamber, e.g. cylinder, in which the fluid actuator, e.g. piston is movably received, wherein the pressure chamber, e.g. cylinder comprises a filling space communicating with a pressure source via a valve for displacing the fluid actuator, e.g. piston, and a control device connected to the valve, wherein the control device is adapted for carrying out the method as described above.

When the filling space is filled with a fluid provided by the pressure source, like an air pump or an oil pump and an oil reservoir, the pressure inside the filling space is applied to the fluid actuator, e.g. piston, so that the fluid actuator, e.g. piston can be displaced towards the torque transmitting elements such as clutch elements. In particular, the torque transmitting elements comprise a first set of at least one first torque transmitting element such as a first clutch element connected to the first shaft and a second set of at least one torque transmitting element such as second clutch element, wherein the first set is movable relatively with respect to the second set. In particular, the first torque transmitting elements such as first clutch elements and the second torque transmitting elements such as second clutch elements are arranged opposite each other, so that each contact face between one first torque transmitting element such as the first clutch element with one second torque transmitting element such as the second clutch element provides friction. Preferably a front face as well as a rear face of a first torque transmitting element such as the first clutch element and/or a second torque transmitting element such as the second clutch element comprises a contact face for contacting the respective other torque transmitting element such as other clutch element. For a clutch, the first shaft may be provided through a through a hole in the fluid actuator, e.g. piston, so that the fluid actuator, e.g. piston may slide along the first shaft, while the second shaft may be connected to the pressure chamber such as the cylinder or vice versa. The piston and the cylinder may be arranged inside a drum for protecting the turning elements of the wet clutch. The piston may be guided inside the cylinder along the circumferential side area of the piston. In particular, the valve can be positioned between the pressure source and the filling space. The valve may be part of a feed line.

For performing an optimized movement of the piston it is sufficient to control the operation of a valve, by which a fluid, like air or oil, e.g. pressurized by an oil pump, can be applied to the piston. Depending on the amount, by which the valve is opened, more or less fluid per time unit is filled into the filling space. Using the feed forward closed loop control of the control device according to embodiments of the present invention, the valve is operated such that the control variable follows or tracks as closely as possible the reference profile, so that the fluid actuator, e.g. piston is moved in an optimized manner. From the reference profile defined at every time during the filling phase, it is clear which value the control variable should meet in the very near future, e.g. at the next time step, so that it is easily possible to meet this value with an increased accuracy, for instance by compensating or overcompensating a detected error in advance. Preferably both feed forward and feedback controls are used. Further, the learning process for determining the optimal control profile of the valve takes place at every coupling and not only for an initial calibration. The wet clutch may be designed further as illustrated above with reference to the method for controlling the wet clutch. Due to the increased control quality by means of the learning controller in the feed forward closed loop controller, which allows for non-linear effects and compensates for changing environmental conditions like varying temperatures, the coupling time can be shortened without increasing the risk of an uncomfortable coupling behavior.

In particular, a pressure sensor for determining the pressure of the filling space and/or a displacement sensor for determining the displacement of the fluid actuator, e.g. piston inside the pressure chamber, e.g. cylinder and/or a first speed sensor for determining the revolution speed of the first shaft and/or a second speed sensor for determining the revolution speed of the second shaft, is/are connected or are connectable to the control device. By means of one or more of these sensors sufficient information for controlling the valve may be collected.

Preferably, the feed forward closed loop control of the control device comprises a learning loop such as an ILC loop for compensating, in particular, an error between the control variable and the reference profile. Due to the repetitive character of the different engagements of a coupling of the brake, wet or dry clutch, the reference profile for the position of the fluid actuator, e.g. piston with respect to the pressure chamber, e.g. within the cylinder and/or the pressure in the pressure chamber, e.g. cylinder during the filling phase can be tracked accurately by a learning loop, particularly with changing environmental conditions like varying temperatures. In particular, in the case that an error between the control variable and the reference profile has increased, for instance caused by an increasing hydraulic oil temperature or increasing wear of the clutch elements, the ILC loop is able to learn this discrepancy and to store the information about the error of the last coupling for use of this information for an improved accuracy at the next coupling.

Preferably, the feed forward closed loop control of the control device comprises a data memory for storing values of the last coupling. Using the data memory, information about the last coupling can be stored and used, particularly by the ILC loop, for increasing the accuracy of the control device. Preferably, a time stamp is stored in the memory, so that it is possible to associate the stored information to a specific point of time. This facilitates the compensation of time-variant effects, like an increasing oil temperature, by the control device.

In a preferred embodiment, a reference memory for storing the reference profile for the control variable is provided, wherein, in particular, the reference profile is adjustable with respect to a target profile for the revolution speed of the first shaft and/or for the revolution speed of the second shaft or the machine part or wheel. The reference memory is in particular editable, i.e. capable of read-write processes, so that the reference profile or a copy of the reference profile can be adjusted. The target profile may be exchanged with a different target profile during a special calibration procedure, e.g. for adapting the brake, dry or wet clutch to a different purpose as originally intended.

In a particular embodiment, the fluid actuator, e.g. piston is biased, e.g. spring-loaded by means of a spring, particularly for moving the fluid actuator, e.g. piston away from the torque transmitting elements, e.g. brake or clutch elements, for use when the pressure source is disconnected. In an embodiment, a pressure has to be applied to the fluid actuator, e.g. piston from the fluid in the filling space only for the filling and slip phase and for keeping the fluid actuator, e.g. piston in the engaged state. The fluid actuator, e.g. piston can be automatically moved away from the torque transmitting elements, e.g. brake or clutch elements by means of the biasing, e.g. spring force, so that the brake, dry or wet clutch disengages, when no pressure is applied by the pressure source.

In a further embodiment the valve or valves is/are adapted to connect the filling space to the pressure source in a first switching status and adapted to connect the filling space with a discharge duct in a second switching status. It is possible to feed and discharge the filling space via the same valve. Particularly an inlet to the filling space and a separate outlet from the filling space is not necessary leading to a facilitated design of the brake, dry or wet clutch.

The present invention also relates to a controller and/or software for carrying out any of the methods of the present invention.

BRIEF DESCRIPTION OF THE DRAWINGS

FIG. 4 is a schematic sectional view of a wet clutch at the beginning of the filling phase with an associated pressure-time diagram, FIG. 5 is a schematic sectional view of a wet clutch at the middle of the filling phase with an associated pressure-time diagram, FIG. 6 is a schematic sectional view of a wet clutch at the end of the filling phase with an associated pressure-time diagram, FIG. 7 is a schematic diagram comparing a reference profile with a sensed profile of a pressure inside a wet clutch.

Figure 1:
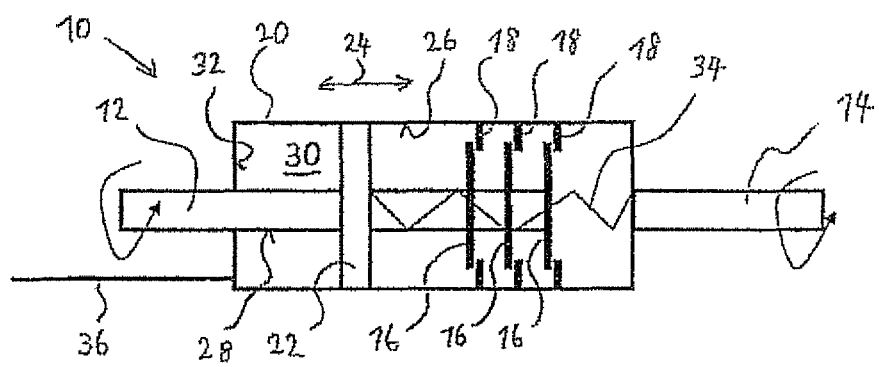
FIG. 1 is a schematic sectional view of a wet clutch during a filling phase.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "coupled", also used in the claims, should not be interpreted as being restricted to direct connections only. The terms "coupled" and "connected", along with their derivatives, may be used. It should be understood that these terms are not intended as synonyms for each other. Thus, the scope of the expression "a device A coupled to a device B" should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

The present invention will be described in the following with reference to a wet clutch as an example, but the present invention is not limited thereto. The present invention also can be applied, for example, to a brake or dry clutch and more generally to torque transmitting devices.

A wet clutch 10 as shown in FIG. 1 comprises a first shaft 12 and a second shaft 14. The first shaft 12 and the second shaft 14 can be coupled to each other via a first set of first clutch elements 16 and a second set of second clutch elements 18, which can be pressed against each other for providing a friction-type connection. Other torque transmitting devices for use with the present invention such as a brake may have other components, e.g. brake shoes that can be moved to apply braking force to a rotating wheel. In general there are two parts of an apparatus that move relatively to each other, whereby the two parts can be brought together by a fluid actuator so that frictional forces are exerted between the two parts to thereby make the speed of the one part the same as the speed of the other part. The final speed can be zero, e.g. as in a braking system.

Figure 10:
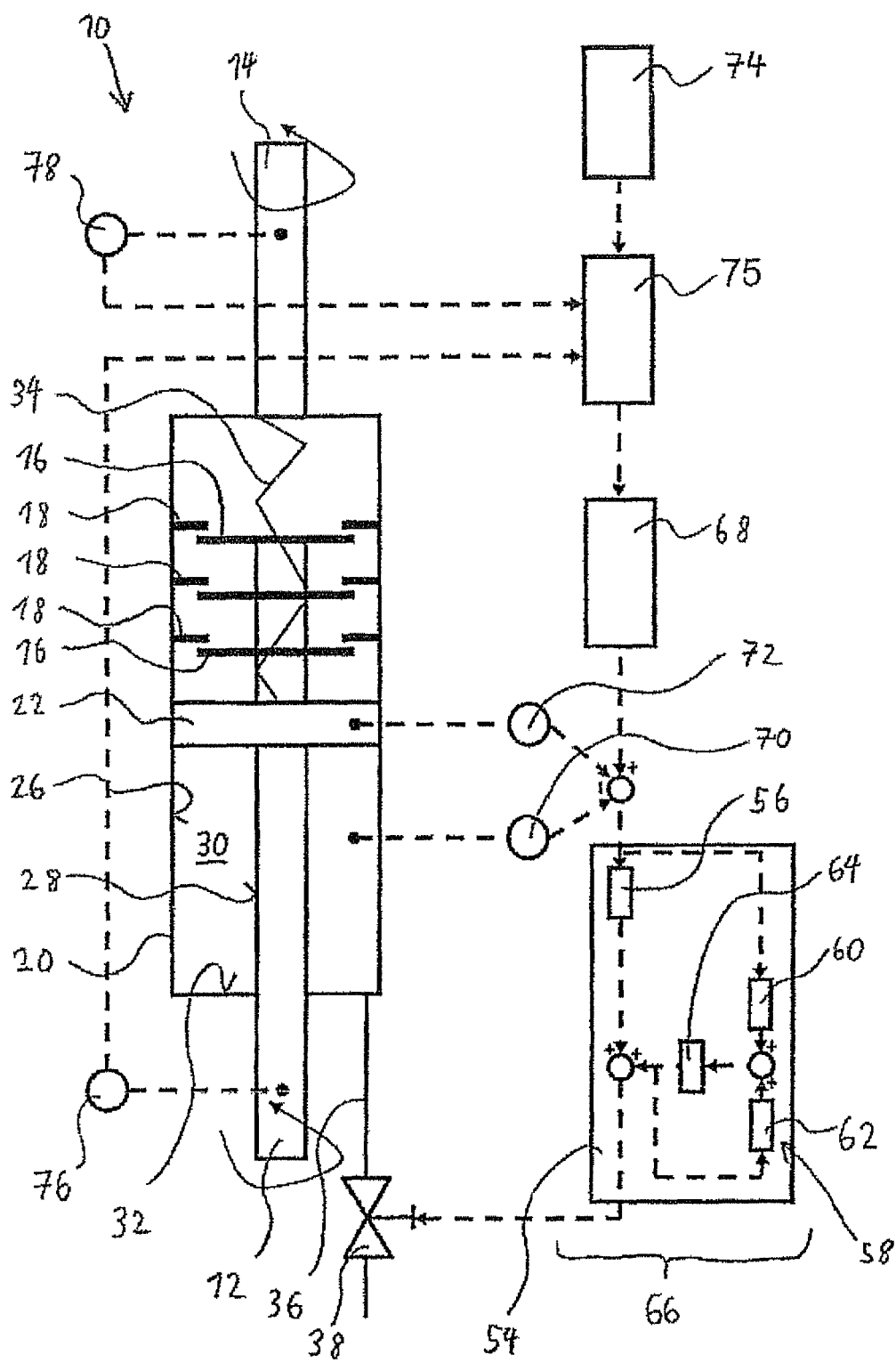
FIG. 10 is a schematic sectional view of a wet clutch with a control device and FIG. 11 is a schematic representation of a computing system that can be used with a control device according to an embodiment of the present invention.

Returning to FIG. 1, the first clutch elements 16 are directly connected to the first shaft 12, while the second clutch elements 18 are connected to the second shaft 14 via a cylinder 20, to which the second clutch elements 18 as well as the second shaft 14 are connected. In the cylinder 20, a piston 22 is received, wherein the piston 22 is movable in the axial direction 24. The piston 22 is able to slide along an inner surface 26 of the cylinder 20 as well as along an outer surface 28 of the first shaft 12. A filling space 30 is located between the piston 22 and a base plate 32 of the cylinder 20. The filling space 30 is reduced by moving the piston 22 in axial direction 24 towards the base plate 32 by means of a biasing element such as a spring 34 arranged between the piston 22 and a cylinder front side opposing to the base plate 32. A feed duct 36 connects the filling space 30 with a pressure source via a valve 38 (FIG. 10). The source can be an oil reservoir and pump for example.

Figure 2:
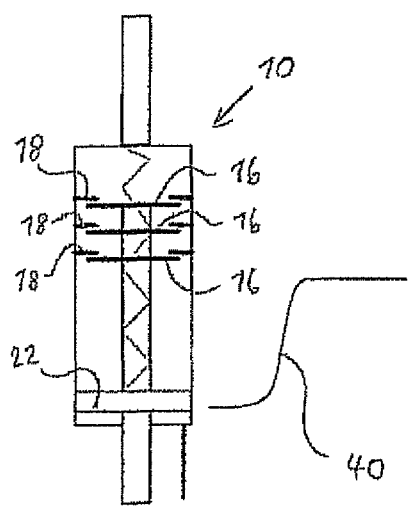
FIG. 2 is a schematic sectional view of a new wet clutch with an associated path-time diagram.
Figure 3:
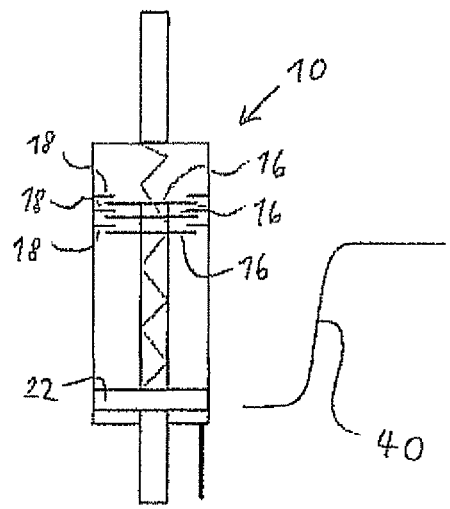
FIG. 3 is a schematic sectional view of a worn wet clutch with an associated path-time diagram.

As can be derived by comparing FIG. 2 with FIG. 3, a new wet clutch 10 (FIG. 2) comprises thicker clutch elements 16, 18 than a wet clutch 10 with worn clutch elements 16, 18 (FIG. 3). As can be derived from the corresponding path-time diagrams 40 the piston 22 has to go through a longer path in the filling phase of the clutch, when the clutch elements 16, 18 are worn, which leads in turn to a longer coupling time, if the control is not adapted to the changed circumstances.

The pressure-time diagrams 42 for the filling phase of the clutch as illustrated in FIG. 4, FIG. 5 and FIG. 6 illustrate an optimized pressure curve inside the filling space 30 of the wet clutch 10. When the coupling is initiated (FIG. 4) the pressure inside the filling space 30 is at its minimum pressure 44. In order to move the piston 22 as fast as possible without the risk of backlashes or vibrations the pressure is increased as fast as possible for accelerating the piston 22 in such manner until a maximum filling pressure 46 is reached (FIG. 5).

From this point of time or after maintaining the maximum filling pressure 46 over a predetermined period of time, the piston 22 is decelerated by reducing the pressure inside the filling space 30 such that a contact pressure 48 is applied to the piston 22 shortly before the piston 22 contacts the clutch elements 16, 18 (FIG. 6) and the slip phase starts. In this slip phase, the pressure will normally increase significantly until the engaged state is reached when the revolution speed of the first shaft 12 corresponds to the revolution speed of the second 14 (FIG. 7). The control signal in the slip phase is generated by a feedforward, a slip feedback controller or another type of controller.

FIG. 7 shows an example of the results of a control of a wet clutch 10 according to the method of the present invention. The filling pressure of the filling space 30 is chosen as a or the control variable in the filling phase. The controlled filling pressure 50 is measured or determined and then compared with a reference profile 52 for the filling pressure in dependence of the time during the filling phase. Although the filling phase is only less than 0.4 sec, the controlled filling pressure 50 meets the reference profile 52 very well.

Figure 8:
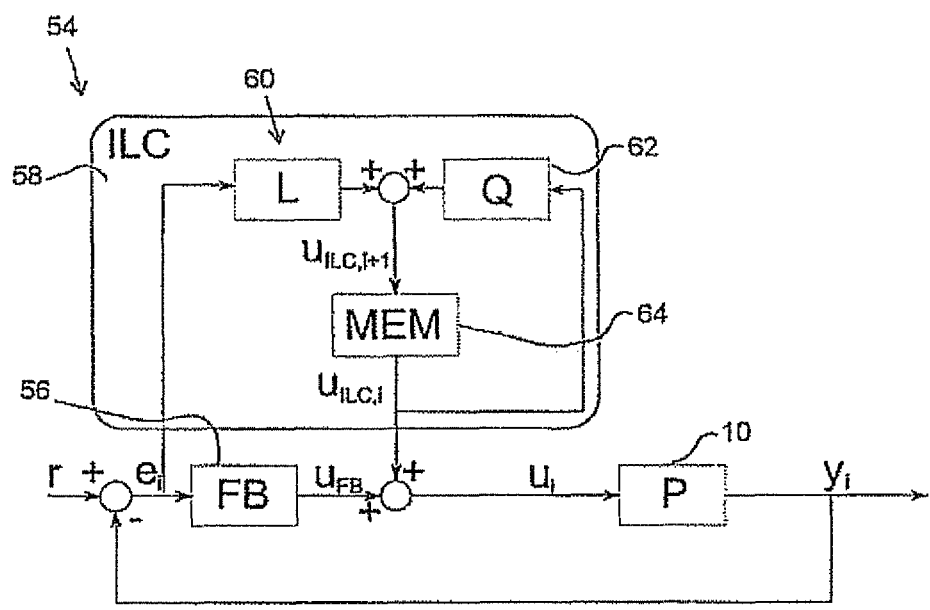
FIG. 8 is a schematic conceptual view of a feed forward closed loop control with ILC loop.

The good control accuracy is performed by a feed forward closed loop control 54 as illustrated in FIG. 8. The wet clutch 10 with a transfer function P(s) provides at a number of couplings i a system output with the control variable $y_i$. The control variable $y_i$ is compared to a reference r, like the reference profile 52 as illustrated in FIG. 7. The result of this comparison is a measured error $e_i$, which is fed to a feedback control 56 with the transfer function FB(s). The feed back control 56 provides a first control signal $u_{FB}$, which is corrected by a second control signal $u_{ILC,i}$ of a feedforward controller. This feedforward controller can comprise an ILC loop 58. The corrected signal $u_i$ is fed to the valve 38 for controlling the wet clutch 10. Further the measured error $e_i$ is processed by a first ILC control 60 of the ILC loop 58 with the transfer function L. In addition the second control signal $u_{ILC,i}$ is processed by a second ILC control 62 with the transfer function Q. The results of the first ILC control 60 and the second ILC control 62 are used to calculate the next second control signal $u_{ILC,i+1}$, which should be used for the next coupling i+1. For that purpose the next second control signal $u_{ILC,i+1}$ is stored in a data memory 64.

Figure 9:
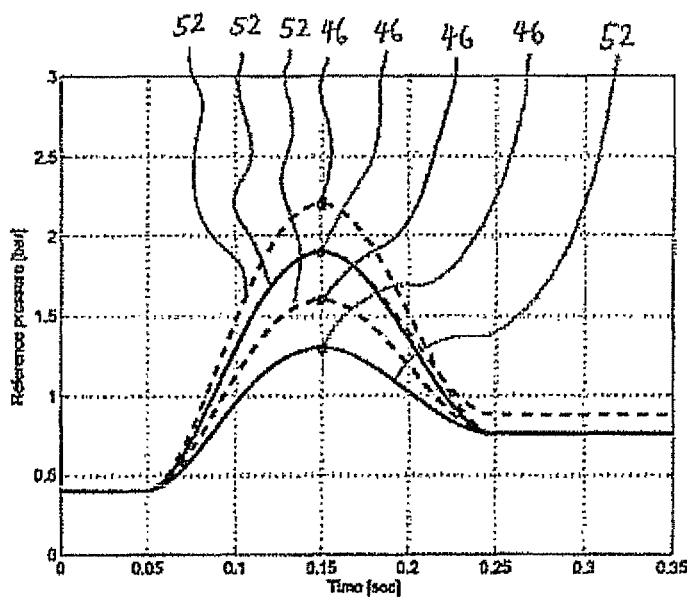
FIG. 9 is a schematic pressure-time diagram for the reference profile at different numbers of performed couplings.

In particular, when the clutch elements 16, 18 are worn as illustrated in FIG. 2 and FIG. 3, the chosen control strategy, particularly the intended reference profile 52, may not fit best anymore. In this case the reference profile 52 may be adjusted for instance by increasing the maximum filling pressure 46 for compensating the wear of the clutch elements 16, 18 as illustrated in FIG. 9.

It is a particular aspect of the present invention that the control signal for the fluid actuator has a value at each sampling time instance, the value at each time instance being freely selectable and not dictated by a rigid parametric design. In particular it is an aspect of the present invention that an iterative learning controller and control method is implemented that has inputs of an error signal and the control signal at each sampling time instance, the output values of the control signal being freely selectable at each sampling time instance. The iterative learning controller and control method preferably make use of linear non-causal filters. The filter parameters may be derived from an appropriate design method, such as the frequency domain based $H_\infty$ method described in Bristow et al.

As illustrated in FIG. 10 the wet clutch 10 comprises a control device 66 connected to the valve 38 for operating the valve 38 and controlling the wet clutch 10. The control device 66 comprises the feed forward closed loop control 54 which is connected to a reference memory 68, where the reference profile 52 for the pressure in the filling space 30 and/or for the displacement of the piston 22 is stored. The pressure in the filling space 30 can be determined by means of a pressure sensor 70 connected to the control device 66. The displacement of the piston 22 can be determined by means of a displacement sensor 72 connected to the control device 66. The comparator 75 compares the revolution speed of the first shaft 12 and the second shaft 14 with a target profile stored in a target memory 74 of the control device 66 and adjusts based on this comparison the reference profile 52. The revolution speed of the first shaft 12 is determined by means of a first speed sensor 76 connected to the comparator 75. The revolution speed of the second shaft 14 is determined by means of a second speed sensor 78 connected to the comparator 75. In case the course of the revolution speeds of the first shaft 12 and the second shaft 14 do not meet the target profile with a sufficient accuracy, an adjustment of the reference profile 52 can be initiated as illustrated in FIG. 9, for instance by increasing the maximum filling pressure 46.

The control device can also be implemented as a separate device suitable for controlling the pressure of a fluid applied to a piston of a wet clutch. When the coupling is initiated (FIG. 4) the control device provides control signals, e.g. to a valve 38, to provide a fluid pressure inside the filling space 30 at its minimum pressure 44. In order to move the piston 22 as fast as possible without the risk of backlashes or vibrations, the control device outputs control signals, e.g. to the valve, to increase the pressure as fast as possible for accelerating the piston 22 in such manner until a maximum filling pressure 46 is reached (FIG. 5). From this point of time on or after maintaining the maximum filling pressure 46 over a predetermined time interval, the control device outputs control signals for causing deceleration of the piston 22, e.g. by reducing the pressure inside the filling space 30, such that a contact pressure 48 is applied to the piston 22 shortly before the piston 22 contacts the clutch elements 16, 18 (FIG. 6) and the slip phase starts. In this slip phase, the pressure will normally increase significantly until the engaged state is reached, i.e. when the revolution speed of the first shaft 12 corresponds to the revolution speed of the second 14 (FIG. 7). The control signal in the filling phase is generated by a feedforward, a slip feedback controller or another type of controller.

In a preferred embodiment the control device uses the filling pressure of the filling space 30 as a or the control variable. The controlled filling pressure 50 is measured or determined by a suitable sensor 70 whose output is fed to the control device and then compared in the control device with a reference profile 52 for the filling pressure, which may be stored in a reference memory 68, in dependence of the time during the filling phase.

The feed forward closed loop control 54 as illustrated in FIG. 8 can be implemented in the control device. The applied controller is not necessarily only a feedforward controller: it can also be the combination of feedback and a feedforward controller. The feedback controller FB(s) can optionally be made zero.

The wet clutch 10 with a transfer function P(s) provides at a number of couplings i a system output including the control variable $y_i$. The control variable $y_i$ is compared to a reference r, like the reference profile 52 as illustrated in FIG. 7. The result of this comparison is a measured error $e_i$, which is fed to a feedback control 56 with the transfer function FB(s). The feedback can be provided by any suitable feedback control system including linear filters, PID, delay compensation, anti-wind-up, . . . .

The feed back control 56 provides a first control signal $u_{FB}$, which is corrected by a second control signal $u_{ILC,i}$ of an ILC loop 58. The corrected signal $u_i$ is fed to the valve 38 for controlling the wet clutch 10. Further the measured error $e_i$ is processed by a first ILC control 60 of the ILC loop 58 with the transfer function L. In addition the second control signal $u_{ILC,i}$ is processed by a second ILC control 62 with the transfer function Q. The results of the first ILC control 60 and the second ILC control 62 are used to calculate the next second control signal $u_{ILC,i+1}$, which should be used for the next coupling i+1. For that purpose the next second control signal $u_{ILC,i+1}$ is stored in a data memory 64.

When the clutch elements 16, 18 are worn as illustrated in FIG. 2 and FIG. 3, the chosen control strategy, particularly the intended reference profile 52, may not fit best anymore. In this case the control device is adapted to adjust the reference profile 52 for instance by increasing the maximum filling pressure 46 for compensating the wear of the clutch elements 16, 18 as illustrated in FIG. 9.

As illustrated in FIG. 10 the wet clutch 10 is for use with the control device 66, which itself is for connection to the valve 38 for operating the valve 38 and thereby controlling the wet clutch 10. The control device 66 comprises the feed forward closed loop control unit 54 which is connected to a reference memory 68, where the reference profile 52 for the pressure in the filling space 30 and/or for the displacement of the piston 22 is stored. The pressure in the filling space 30 can be determined by means of a pressure sensor 70 that is connectable to the control device 66. The displacement of the piston 22 can be determined by means of a displacement sensor 72 connectable to the control device 66. For adjusting the reference profile 52 the control device checks, whether the revolution speed of the first shaft 12 and the second shaft 14 meet a target profile stored in a target memory 74 of the control device 66. The revolution speed of the first shaft 12 is determined by means of a first speed sensor 76 connectable to the target memory 74. The revolution speed of the second shaft 14 is determined by means of a second speed sensor 78 connectable to the target memory 74. In case the course of the revolution speeds of the first shaft 12 and the second shaft 14 do not meet the target profile with a sufficient accuracy, the control device is adapted to initiate an adjustment of the reference profile 52 as illustrated in FIG. 9, for instance by increasing the maximum filling pressure 46.

The control device 66 according to embodiments of the present invention may be implemented as hardware, computer software, or combinations of both. The controller 66 may include a general purpose processor, an embedded processor, an application specific integrated circuit (ASIC), a field programmable gate array (FPGA) or other programmable logic device, discrete gate or transistor logic, discrete hardware components, or any combination designed to perform the functions described herein. A processor may also be implemented as a combination of computing devices, e.g. a combination of an FPGA and a microprocessor, a plurality of microprocessors, one or more microprocessors in conjunction with an FPGA, or any other such configuration.

Figure 11:
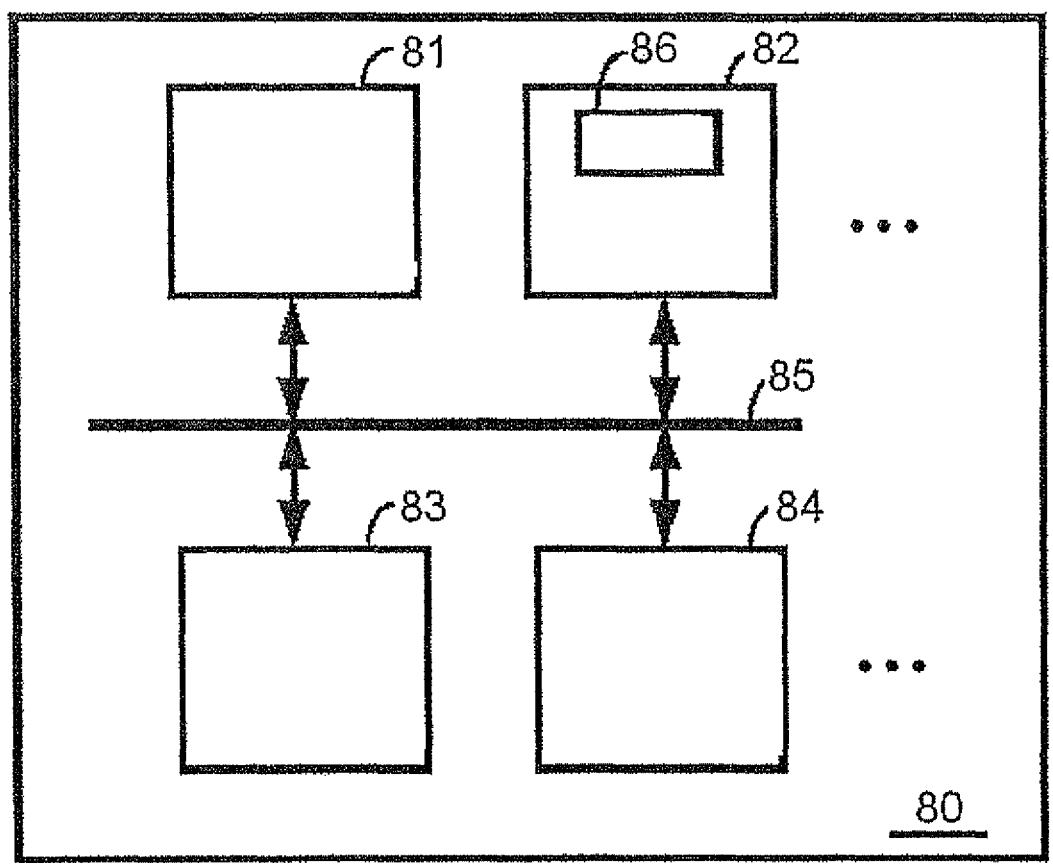

The processing system may include a computing device or processing engine, e.g. a microprocessor. Any of the test methods described above according to embodiments of the present invention or claimed may be implemented in a processing system 80 such as shown in FIG. 11. FIG. 11 shows one configuration of processing system 80 that includes at least one customisable or programmable processor 81 coupled to a memory subsystem 82 that includes at least one form of memory, e.g., RAM, ROM, and so forth. It is to be noted that the processor 81 or processors may be a general purpose, or a special purpose processor, and may be for inclusion in a device, e.g. a chip that has other components that perform other functions. Thus, one or more aspects of the method according to embodiments of the present invention can be implemented in digital electronic circuitry, or in computer hardware, firmware, software, or in combinations of them. The processing system may include a storage subsystem 83 that has at least one disk drive and/or CD-ROM drive and/or DVD drive. In some implementations, a display system, a keyboard, and a pointing device may be included as part of a user interface subsystem 84 to provide for a user to manually input information, such as parameter values. Ports for inputting and outputting data may be included. More elements such as network connections including wireless and/or wired connections, interfaces to various devices including wireless and/or wired interfaces, and so forth, may be included, but are not illustrated in FIG. 11. These may be used for remote operation of the test equipment. The various elements of the processing system 80 may be coupled in various ways, including via a bus subsystem 85 shown in FIG. 11 for simplicity as a single bus, but which will be understood to those in the art to include a system of at least one bus. The memory of the memory subsystem 82 may at some time hold part or all (in either case shown as 86) of a set of instructions that when executed on the processing system 80 implement the steps, of the method embodiments described herein. The processing system described above is adapted to receive the output signals from the sensors 70, 72, 76 and/or 78 and to perform calculations and to output a value representative of the control signal $u_i$.

A control device, e.g. as implemented in accordance with FIG. 11 is provided by the present invention for controlling a torque transmitting device for coupling a first torque transmitting element to a second torque transmitting element, the torque transmitting device comprising a fluid actuator for actuating the first and second torque transmitting elements, a pressure chamber, in which the fluid actuator is movably received, wherein the pressure chamber comprises a filling space communicating with a pressure source via a valve for displacing the fluid actuator, the valve being for connecting to the control device. Such a the control device may comprise means for storing a reference profile for a control variable, wherein the chronological progress of said control variable influences the position of the fluid actuator for actuating first and second torque transmitting elements. The controller may also include means for determining the control variable during each coupling; and means for operating the valve for applying a pressure source to the fluid actuator. Preferably the means for operating the valve is adapted to carry out a feed forward closed loop control algorithm such that the control variable follows the reference profile.

The control device is preferably adapted to provide a control signal to the fluid actuator at each sampling time instance, the control signal having a value at each time instance that is freely selectable.

The means for operating the valve are adapted preferably to modify the reference profile so that it compensates for the impact of wear of the first or second torque transmitting elements over time. In an embodiment, each first or second torque transmitting element is connected to a first shaft or a second shaft, the control device having an input for a signal representing a revolution speed of the first shaft and/or the revolution speed of the second shaft and wherein the control device is adapted to adjust the reference profile with respect to a target profile for the revolution speed of the first shaft and/or for the revolution speed of the second shaft.

In an alternative embodiment each first or second torque transmitting element is as previously connected to a first shaft or a second shaft, the control device having an input for a signal representing a revolution speed of the first shaft and/or the revolution speed of the second shaft but wherein the control device is adapted to adjust the reference profile with respect to a target profile for the input torque of the torque transmitting device and/or for the output torque of the torque transmitting device.

The control device may be adapted to adjust the reference profile (52) after a predetermined number of couplings, wherein the predetermined number N of couplings is particularly $2 \leq N \leq 50$, preferably $3 \leq N \leq 25$, more preferred $4 \leq N \leq 15$ and most preferred $5 \leq N \leq 10$. The control device may also be adapted so that for executing the feed forward closed loop control algorithm, the control device has a learning loop for compensating an error between the control variable and the reference profile.

Optionally, the control device is adapted so that for executing the feed forward closed loop control algorithm, the control device comprises a learning loop for compensating an increasing error between the control variable and the reference profile wherein the learning loop processes in preparation for the next coupling, the output signal of the learning loop of the last coupling as well as the difference between the control variable and the reference profile at the last coupling.

For example, the control device can provide feed forward closed loop control with iterative learning control that has inputs of an error signal and the control signal at each sampling time instance, the output values of the control signal being freely selectable at each sampling time instance.

As an example, the control device is adapted so that the feed forward closed loop control algorithm compensates for the impact of the temperature of the fluid provided by the pressure source over time. In an implementation the control device comprises a data memory for storing values of the last coupling.

In addition a reference memory may be provided for storing the reference profile for the control variable, wherein the reference profile is adjustable with respect to a target profile for the revolution speed of the first shaft and/or for the revolution speed of the second shaft.

Alternatively, the reference memory stores the reference profile for the control variable, and the reference profile is adjustable with respect to a target profile for the input torque of the torque transmitting device and/or for the output torque of the torque transmitting device.

The present invention also includes a computer program product which provides the functionality of any of the methods according to the present invention when executed on a computing device. Software according to the present invention, when executed on a processing engine, can contain code segments that provide a method for controlling a torque transmitting device during a filling phase for coupling a first torque transmitting element to a second torque transmitting element via the torque transmitting device. An example is a method for controlling a dry or wet clutch during a filling phase for coupling a first shaft to a second shaft via the wet clutch. The software may be adapted to provide or receive a reference profile for a control variable, wherein the chronological progress of said control variable influences the position of a fluid actuator for actuating the first and second torque transmitting elements, with respect to a pressure chamber of the torque transmitting device.

For example, the system uses the reference profile for the control variable, wherein the chronological progress of said control variable influences the position of a piston for actuating wet or dry clutch elements, wherein each clutch element is connected to the first shaft or the second shaft, with respect to a cylinder of the dry or wet clutch. The software preferably comprises code segments such that when executed on a processing engine the control variable is determined during each coupling; and the operation of a valve is controlled for applying a pressure source to the fluid actuator. The software can be adapted to control the valve during each coupling by means of a feed forward closed loop control such that the control variable follows the reference profile.

The software may be adapted to provide the adaptive control algorithm such that it compensates for the impact of wear of the clutch elements over time. The software may be adapted such that the feed forward closed loop control provides a control signal to the fluid actuator at each sampling time instance, the control signal having a value at each time instance that is freely selectable.

The software may also be adapted such that when each torque transmitting element is connected to a first shaft or a second shaft; the revolution speed of the first shaft and/or the revolution speed of the second shaft is determined; and the reference profile is adjusted with respect to a target profile for the revolution speed of the first shaft and/or for the revolution speed of the second shaft.

The software can be adapted such that an input torque of the torque transmitting device and/or an output torque of the torque transmitting device are determined; and the reference profile is adjusted with respect to a target profile for the input torque of the torque transmitting device and/or for the output torque of the torque transmitting device.

The software can be adapted such that the adjustment of the reference profile is performed after a predetermined numbers of couplings, wherein the predetermined number N of couplings is particularly 2≤N≤50, preferably 3≤N≤25, more preferred 4≤N≤15 and most preferred 5≤N≤10.

The software may be adapted such that the feed forward closed loop control comprises a learning loop for compensating an increasing error between the control variable and the reference profile, the learning loop processing in preparation for the next coupling, the output signal of the learning loop of the last coupling as well as the difference between the control variable and the reference profile at the last coupling.

Optionally, the software may be adapted such that the feed forward closed loop control is an iterative learning control that has inputs of an error signal and the control signal at each sampling time instance, the output values of the control signal being freely selectable at each sampling time instance.

The software can be adapted to use the displacement of the piston with respect to an axially arranged base plate of the cylinder as a control variable and/or to use the pressure of a filling space of the cylinder as a control variable, wherein the filling space communicates with the pressure source for displacing the piston.

The software may be adapted such that the feed forward closed loop control algorithm compensates for the impact of the temperature of the fluid provided by the pressure source over the time.

Such a computer program product can be tangibly embodied in a carrier medium carrying machine-readable code for execution by a programmable processor. The present invention thus relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non-volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

Other variations can be envisaged within the scope of the claims.

The invention claimed is:

1. Method for controlling a torque transmitting device during a filling phase for coupling a first torque transmitting element to a second torque transmitting element via the torque transmitting device, wherein each torque transmitting element is connected to a first shaft or a second shaft;

the method comprising the steps of:
providing a reference profile for a control variable, wherein a chronological progress of said control variable influences a position of a fluid actuator actuating the first and second torque transmitting elements, with respect to a pressure chamber of the torque transmitting device;
determining the control variable during each coupling;
operating a valve that applies a pressure source to the fluid actuator, wherein the valve is controlled during each coupling by a feed forward closed or open loop control, wherein the feed forward closed or open loop control comprises a learning loop that compensates for an increasing error between the control variable and the reference profile during the chronological progress, the learning loop processing, in preparation for the next coupling, an output signal of the learning loop of the last coupling as well as the difference between the control variable and the reference profile at the last coupling, such that the control variable follows the reference profile; and
adjusting the reference profile to compensate for changing system properties that affect the coupling time and smoothness of the coupling by:
determining a revolution speed of the first shaft and/or a revolution speed of the second shaft; and
adjusting the reference profile with respect to a target profile for the revolution speed of the first shaft and/or the revolution speed of the second shaft by adjusting one or more parameters of the reference profile,
or
determining an input torque of the torque transmitting device and/or an output torque of the torque transmitting device; and
adjusting the reference profile with respect to a target profile for the input torque of the torque transmitting device and/or the output torque of the torque transmitting device by adjusting one or more parameters of the reference profile.

2. Method according to claim 1, wherein the learning loop is an iterative learning control that has inputs of an error signal and the control signal at each sampling time instance, the output values of the control signal being freely selectable at each sampling time instance.

3. Method according to claim 1, wherein the fluid actuator is a piston and the pressure chamber is a cylinder, wherein the displacement of the piston with respect to an axially arranged base plate of the cylinder is chosen as a control variable.

4. Method according to claim 1, wherein the pressure of a filling space of the pressure chamber is selected as a control variable and wherein the filling space communicates with the pressure source for displacing the fluid actuator.

5. Method according to claim 1, wherein the feed forward closed or open loop control compensates for the impact of any system variation over time.

6. A torque transmitting device for coupling a first torque transmitting element to a second torque transmitting element, comprising:
a fluid actuator arranged to actuate the first and second torque transmitting elements;

a pressure chamber, in which the fluid actuator is movably received, wherein the pressure chamber comprises a filling space communicating with a fluid pressure source via a valve controlling displacement of the fluid actuator; and a control device connected to the valve, wherein a feed forward closed or open loop control of the control device comprises a learning loop that compensates for an increasing error between the control variable and a reference profile, and a reference memory storing the reference profile for the control variable, wherein the reference profile is adjustable with respect to a target profile for a revolution speed of the first shaft and/or for a revolution speed of the second shaft and wherein the reference profile is also adjustable with respect to a target profile for an input torque of the torque transmitting device and/or for an output torque of the torque transmitting device, wherein the control device is configured to carry out the method as recited in claim 1.

7. Torque transmitting device according to claim 6, wherein a pressure sensor that determines the pressure of the filling space and/or a displacement sensor that determines the displacement of the fluid actuator inside the pressure chamber and/or a first speed sensor that determines the revolution speed of the first shaft and/or a second speed sensor that determines the revolution speed of the second shaft, are connected to the control device.

8. Torque transmitting device according to claim 6, wherein the feed forward closed or open loop control of the control device comprises a data memory for storing values of the last coupling.

9. Torque transmitting device according to claim 6, wherein control device is a feed forward closed or open loop control device for iterative learning control that has inputs of an error signal and the control signal at each sampling time instance, the output values of the control signal being freely selectable at each sampling time instance.

10. A control device for controlling a torque transmitting device for coupling a first torque transmitting element to a second torque transmitting element, the torque transmitting device comprising a fluid actuator that actuates the first and second torque transmitting elements, a pressure chamber, in which the fluid actuator is movably received, wherein the pressure chamber comprises a filling space communicating with a pressure source via a valve controlling displacement of the fluid actuator, the valve being for connecting to the control device, the control device comprising:

means for storing a reference profile for a control variable, wherein a chronological progress of said control variable influences a position of the fluid actuator for actuating first and second torque transmitting elements;

means for determining the control variable during each coupling; and means for operating the valve for applying a pressure source to the fluid actuator, the means for operating the valve being configured to carry out a feed forward closed or open loop control algorithm such that the control variable follows the reference profile, the control device being configured so that for executing the feed forward closed or open loop control algorithm, the control device has a learning loop for compensating an error between the control variable and the reference profile, wherein the learning loop processes, in preparation for a next coupling, an output signal of a learning loop of a last coupling as well as a difference between the control variable and a reference profile at the last coupling, wherein each first or second torque transmitting element is connected to a first shaft or a second shaft, the control device having an input for a signal representing a revolution speed of the first shaft and/or a revolution speed of the second shaft and wherein the control device is configured to adjust at least one parameter of the reference profile to compensate for changes in system properties that affect the coupling time and smoothness of the coupling with respect to a target profile for a revolution speed of the first shaft and/or for a revolution speed of the second shaft or the control device further comprising means for determining an input torque of the torque transmitting device and/or an output torque of the torque transmitting device and said control device being configured to adjust at least one parameter of the reference profile to compensate for changes in system properties that affect the coupling time and smoothness of the coupling with respect to a target profile for the input torque of the torque transmitting device and/or the output torque of the torque transmitting device.

11. The control device according to claim 10, wherein the control device is a feed forward closed or open loop control device for iterative learning control that has inputs of an error signal and the control signal at each sampling time instance, the output values of the control signal being freely selectable at each sampling time instance.

12. The control device according to claim 10 wherein the control device is arranged so that the feed forward closed or open loop control algorithm compensates for the impact of a temperature of the fluid provided by the pressure source over time.

13. The control device according to claim 11, wherein the control device comprises a data memory that is arranged to store values of the last coupling.

14. A non-transient computer program product that includes code segments that implement the method of claim 1 when executed on a processing machine.

15. A machine readable signal storage means for storing the computer program product recited in claim 14.

16. The method according to claim 1, wherein the reference profile is adjusted after a predetermined number of successive couplings.

17. The method according to claim 16, wherein the predetermined number of successive couples is between 2 and 50 couplings.

* * * * *